(12) United States Patent
Sheshadri et al.

(10) Patent No.: US 11,818,219 B2
(45) Date of Patent: Nov. 14, 2023

(54) SESSION MANAGEMENT SYSTEM

(71) Applicant: PayPal, Inc., San Jose, CA (US)

(72) Inventors: Aashish Sheshadri, San Jose, CA (US);
Gurudatha Baliga, Chandler, AZ (US);
Michael Hodgdon, Maricopa, AZ (US)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 17/446,824

(22) Filed: Sep. 2, 2021

(65) Prior Publication Data

US 2023/0062052 A1 Mar. 2, 2023

(51) Int. Cl.
*H04L 67/141* (2022.01)
*H04L 9/40* (2022.01)
*H04L 41/22* (2022.01)
*H04L 67/143* (2022.01)

(52) U.S. Cl.
CPC ............ *H04L 67/141* (2013.01); *H04L 41/22* (2013.01); *H04L 63/168* (2013.01); *H04L 67/143* (2013.01)

(58) Field of Classification Search
CPC ..... H04L 67/141; H04L 41/22; H04L 63/168; H04L 67/143; H04L 63/1441; H04L 63/1425; G06F 11/0793; G06F 18/24137
See application file for complete search history.

(56) References Cited

U.S. PATENT DOCUMENTS

| | | | |
|---|---|---|---|
| 9,275,359 B1 * | 3/2016 | Fomin | G06F 16/254 |
| 9,973,517 B2 * | 5/2018 | Hsiao | H04L 63/1416 |
| 10,061,816 B2 * | 8/2018 | Convertino | G06F 16/24573 |
| 10,084,869 B2 * | 9/2018 | Verkasalo | H04L 41/22 |
| 10,581,977 B2 * | 3/2020 | Goldfarb | H04L 63/0272 |
| 10,685,044 B2 * | 6/2020 | Miranda | G06N 5/04 |
| 10,706,229 B2 * | 7/2020 | Xu | G06F 40/284 |

(Continued)

FOREIGN PATENT DOCUMENTS

JP H1024026 A * 1/1998

OTHER PUBLICATIONS

Malaval, Nicolas, *How to Record SSH Sessions Established Through a Bastion Host*, AWS Security Blog, Jun. 14, 2016; Retrieved Sep. 2, 2021 from https://aws.amazon.com/blogs/security/how-to-record-ssh-sessions-established-through-a-bastion-host/.

(Continued)

*Primary Examiner* — Bharat Barot
*Assistant Examiner* — Alex H. Tran
(74) *Attorney, Agent, or Firm* — HAYNES AND BOONE, LLP

(57) ABSTRACT

A computing device accesses a session log that includes a recording of user interactions of a user during a session with an application instance in a computing environment. The computing device cleanses the session log to remove a portion of the content included in the session log to generate a cleansed session log and converts the cleansed session log into a session vector representation using a finite dictionary built from a plurality of session logs associated with a plurality of users that have interacted with the computing environment. The computing device generates a user model for the user using the session vector representation and a plurality of other session vector representations associated with the user. The model may be used to perform management and security operations in the computing environment.

20 Claims, 13 Drawing Sheets

(56) References Cited

U.S. PATENT DOCUMENTS

| | | | |
|---|---|---|---|
| 10,721,256 B2* | 7/2020 | Urmanov | G06F 11/3072 |
| 10,728,338 B2* | 7/2020 | Loeb | H04L 67/12 |
| 10,944,777 B2* | 3/2021 | Lin | G06N 5/047 |
| 11,226,975 B2* | 1/2022 | Patthak | G06F 16/248 |
| 2003/0046072 A1 | 3/2003 | Ramaswamy et al. | |
| 2006/0129652 A1 | 6/2006 | Petrovskaya | |
| 2008/0086558 A1 | 4/2008 | Bahadori et al. | |
| 2009/0070283 A1* | 3/2009 | Kang | G06N 20/00 706/45 |
| 2009/0164926 A1 | 6/2009 | Boyle et al. | |
| 2019/0116193 A1* | 4/2019 | Wang | G06N 20/00 |
| 2019/0289058 A1 | 9/2019 | Bhoj et al. | |
| 2020/0076841 A1 | 3/2020 | Hajimirsadeghi et al. | |
| 2020/0233857 A1* | 7/2020 | Fehling | G06Q 10/10 |
| 2020/0310939 A1* | 10/2020 | Kußmaul | G06F 40/30 |
| 2020/0336503 A1* | 10/2020 | Xu | H04L 63/1425 |
| 2021/0109838 A1* | 4/2021 | Watanabe | G06F 11/079 |
| 2021/0157577 A1* | 5/2021 | Sobran | G06F 40/20 |
| 2021/0357282 A1* | 11/2021 | Verma | G06F 11/3419 |
| 2021/0374229 A1* | 12/2021 | Kumar | G06F 21/561 |
| 2021/0406112 A1* | 12/2021 | Moss | G06F 11/0787 |
| 2022/0035775 A1* | 2/2022 | Sriharsha | G06K 9/6231 |
| 2022/0116415 A1* | 4/2022 | Burgis | H04L 63/1425 |

OTHER PUBLICATIONS

GitHub.com. *SentencePiece*. Retrieved Sep. 2, 2021, from https://github.com/google/sentencepiece.

Li, Wen et al., *Approximate Nearest Neighbor Search on High Dimensional Data—Experiments, Analysis, and Improvement* (v1.0); The University of Technology Sydney, The University of New South Wales, China University of Mining and Technology, 8 October 2016, 26pp., https://arxiv.org/pdf/1610.02455.pdf.

International Search Report and Written Opinion for Application No. PCT/US2022/41722 dated Jan. 9, 2023, 18 pages.

\* cited by examiner

```
Script started on Wed 22 May 2021 11:46:41 PM PDT
[ptroino@txt01sth01 ~] $ ssh 10.47.91.281^M
                ###########################################^M
                #     This system is for the use of authorized users only.    #^M
                #     Individuals using this computer system without          #^M
                #     authority, or in excess of their authority, are         #^M
                #     subject to having all of their activities on this       #^M
                #     system monitored and recorded by system personnel.      #^M
                #                                                             #^M
                #     In the course of monitoring individuals improperly      #^M
                #     using this system, or in the course of system           #^M
                #     maintenance, the activities of authorized users         #^M
                #     may also be monitored.                                  #^M
                #                                                             #^M
                #     Anyone using this system expressly consents to such     #^M
                #     monitoring and is advised that if such monitoring       #^M
                #     reveals possible evidence of criminal activity,         #^M
                #     system personnel may provide the evidence of such       #^M
                #     monitoring to law enforcement officials.                #^M
                ###########################################^M
^M
Password: ^M
Welcome to Ubuntu 16.04.5 LTS (GNU/Linux 4.15.0-36-generic x86_64) ^M
^M
         -     Documentation: https://help.ubuntu.com ^M
         -     Management:    https://landscape.canonical.com^M
         -     Support:   https://ubuntu.com/advantage^M
^M
 Get cloud support with Ubuntu Advantage Cloud Guest:^M
    http://www.ubuntu.com/business/services/cloud^M
^M
94 packages can be updated.^M
74 updates are security updates.^M
^M
New release '18.04.2 LTS' available.^M
Run 'do-release-upgrade' to upgrade to it.^M
^M
^M
*** System restart required ***^M
FQDN: txt01sth010701b.txt.provider.com^M
Datacenter: txt^M
The OS is: Ubuntu/16.04/amd64^M
Hardware: OpenStack Nova^M
Memory size: 7.79 GB^M
Physical CPU count: 2 Cores (including HT): 2^M
This is a machine of type: kvm^M
Network Information:^M
eth0 12.84.88.117/255.255.255.0^M
Last login: Thu May 23 05:43:44 2021 from 10.38.131.21^M^M
FQDN: txt01sth010701b.txt.provider.com^M
The OS is: Ubuntu/16.04/amd64^M
Hardware: OpenStack Nova^M
Memory size: 7.79 GB^M
Physical CPU count: 2 Cores (including HT): 2^M
This is a machine of type: kvm^M
Network Information:^M
eth0 12.84.88.117/255.255.255.0^M
ptroino@txt01sth010701b:~ ssh con ^H^[[K^H^[[K^H^[[K^H^[[K^H^[[K^H^[[K^H^[[K^H^[[K^H^[[K ^H^[[K^H^[[Ksh con
^H^[[K^H^[[K^H^[[Kslcla^H^[[Knetwork^H^[[K^H^[[K^H^[[K^H^[[K^H^[[K^H^[[Knetworkmgt^H^[[K^H^[[Kgmt1a^M
"20210522_234567_12345678-txt01sth01-ptroino.data" [readonly][noeol] 296L, 20131C      4,1            Top
```

FIG. 5

```
Script started on Wed 22 May 2021 11:46:41 PM PDT
[ptroino@txt01sth01 ~] $ ssh 10.47.91.281
        ############################################################
        #                                                          #
        #   This system is for the use of authorized users only.   #
        #   Individuals using this computer system without         #
        #   authority, or in excess of their authority, are        #
        #   subject to having all of their activities on this      #
        #   system monitored and recorded by system personnel.     #
        #                                                          #
        #   In the course of monitoring individuals improperly     #
        #   using this system, or in the course of system          #
        #   maintenance, the activities of authorized users        #
        #   may also be monitored.                                 #
        #                                                          #
        #   Anyone using this system expressly consents to such    #
        #   monitoring and is advised that if such monitoring      #
        #   reveals possible evidence of criminal activity,        #
        #   system personnel may provide the evidence of such      #
        #   monitoring to law enforcement officials.               #
        ############################################################

Password:
Welcome to Ubuntu 16.04.5 LTS (GNU/Linux 4.15.0-36-generic x86_64)
                    504a
    -   Documentation:  https://help.ubuntu.com
    -   Management:     https://landscape.canonical.com
    -   Support:        https://ubuntu.com/advantage Get cloud support with Ubuntu Advantage Cloud Guest:
    http://www.ubuntu.com/business/services/cloud 94 packages can be updated.
74 updates are security updates.
^M
New release '18.04.2 LTS' available.
Run 'do-release-upgrade' to upgrade to it.

*** System restart required ***
FQDN: txt01sth010701b.txt.provider.com
Datacenter: txt
The OS is: Ubuntu/16.04/amd64
Hardware: OpenStack Nova
Memory size: 7.79 GB
Physical CPU count: 2 Cores (including HT): 2
This is a machine of type: kvm
Network Information:
eth0 12.84.88.117/255.255.255.0
Last login: Thu May 23 05:43:44 2021 from 10.38.131.21
FQDN: txt01sth010701b.txt.provider.com
The OS is: Ubuntu/16.04/amd6
Hardware: OpenStack Nova
Memory size: 7.79 GB
Physical CPU count: 2 Cores (including HT): 2
This is a machine of type: kvm
Network Information:
eth0 12.84.88.117/255.255.255.0
ptroino@txt01sth010701b:~ ssh slcnetworkmgt1a
"20210522_234567_12345678-txt01sth01-ptroino.data" 296L, 20131C
```

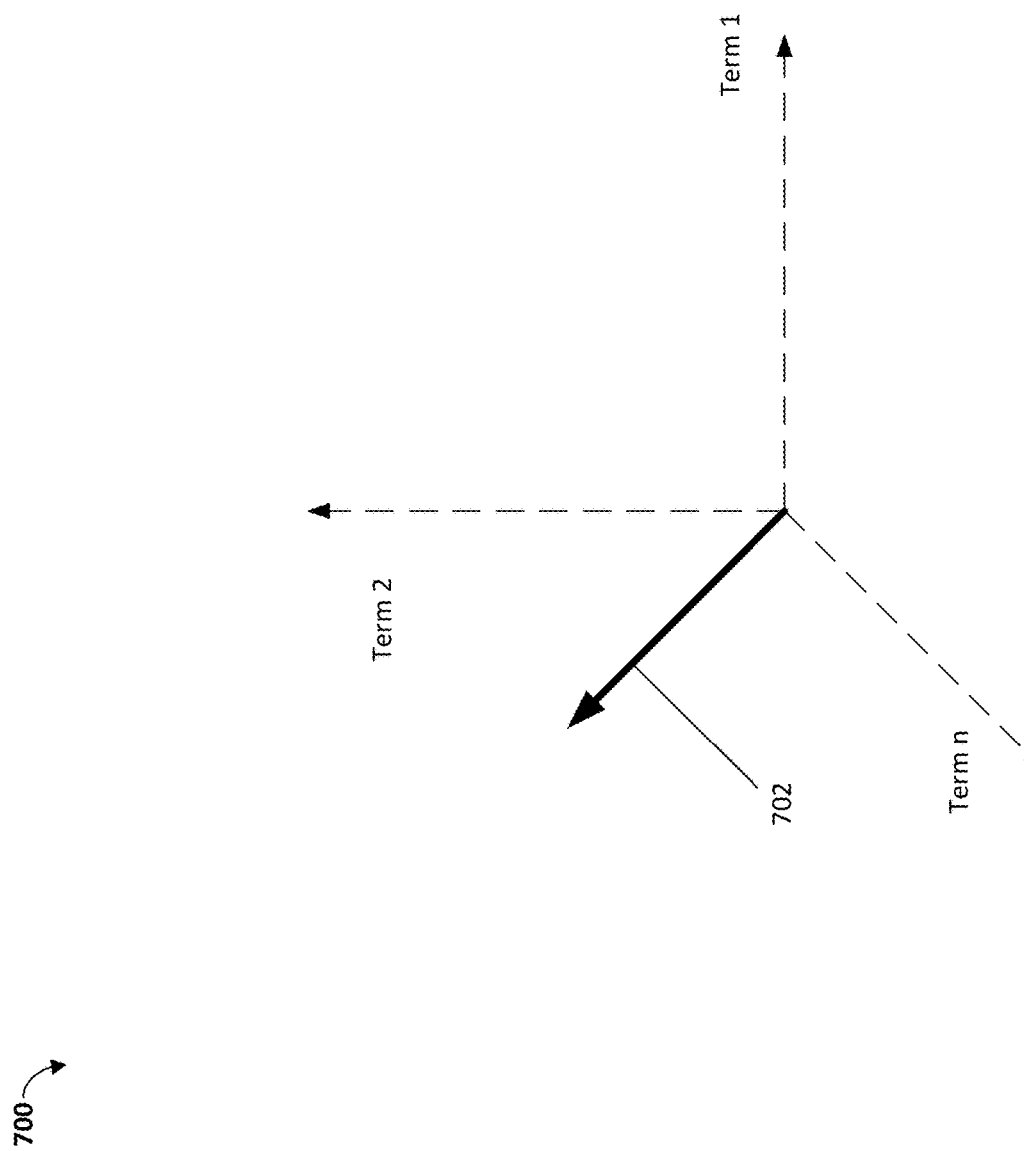

SESSION MANAGEMENT SYSTEM

FIELD OF INVENTION

The present specification generally relates to management of sessions established in a secure computing environment, and more specifically to capturing sessions and generating models for users associated with those sessions where the models are used to perform management and/or security operations according to various embodiments of the disclosure.

BACKGROUND

Enterprises may require a user to operate network services over an unsecured network. Various cryptographic network protocols (e.g., Telnet, unsecured remote shell protocols, Secure Shell or Secure Socket Shell (SSH)) may be used to provide security by providing a secure channel or session between an application on the user's device and the network services over unsecured network. For example, SSH is a network protocol that provides users secure access to a computer over an unsecured network. SSH provides strong password authentication and public key authentication, as well as encrypted data communications between two computers connecting over an open network, such as the Internet. In addition to providing strong encryption, SSH is widely used by network administrators for managing systems and applications remotely, enabling them to log in to another computer over a network, execute commands and move files from one computer to another. SSH uses the client-server model, connecting a SSH client application, which is the end where an SSH session is displayed, with an SSH server, which is the end where the SSH session runs. In a particular example, a bastion host server provides access to a private network, on which an application instance for a session runs, from an external network, such as the Internet, using SSH. The bastion host server mitigates the risk of allowing SSH connections from an external network to application instances (e.g., Linux instances) launched in a private subnet/network of a private cloud.

BRIEF DESCRIPTION OF FIGURES

FIG. 5 illustrates a session log generated during the method of FIG. 3 according to an embodiment of the present disclosure;

FIG. 6 illustrates a cleansed session log of the session log of FIG. 5 during the method of FIG. 3 according to an embodiment of the present disclosure;

FIG. 7 illustrates a graph of a session vector representation of the cleansed session log of FIG. 6 during the method of FIG. 3 according to an embodiment of the present disclosure;

Figure 1:
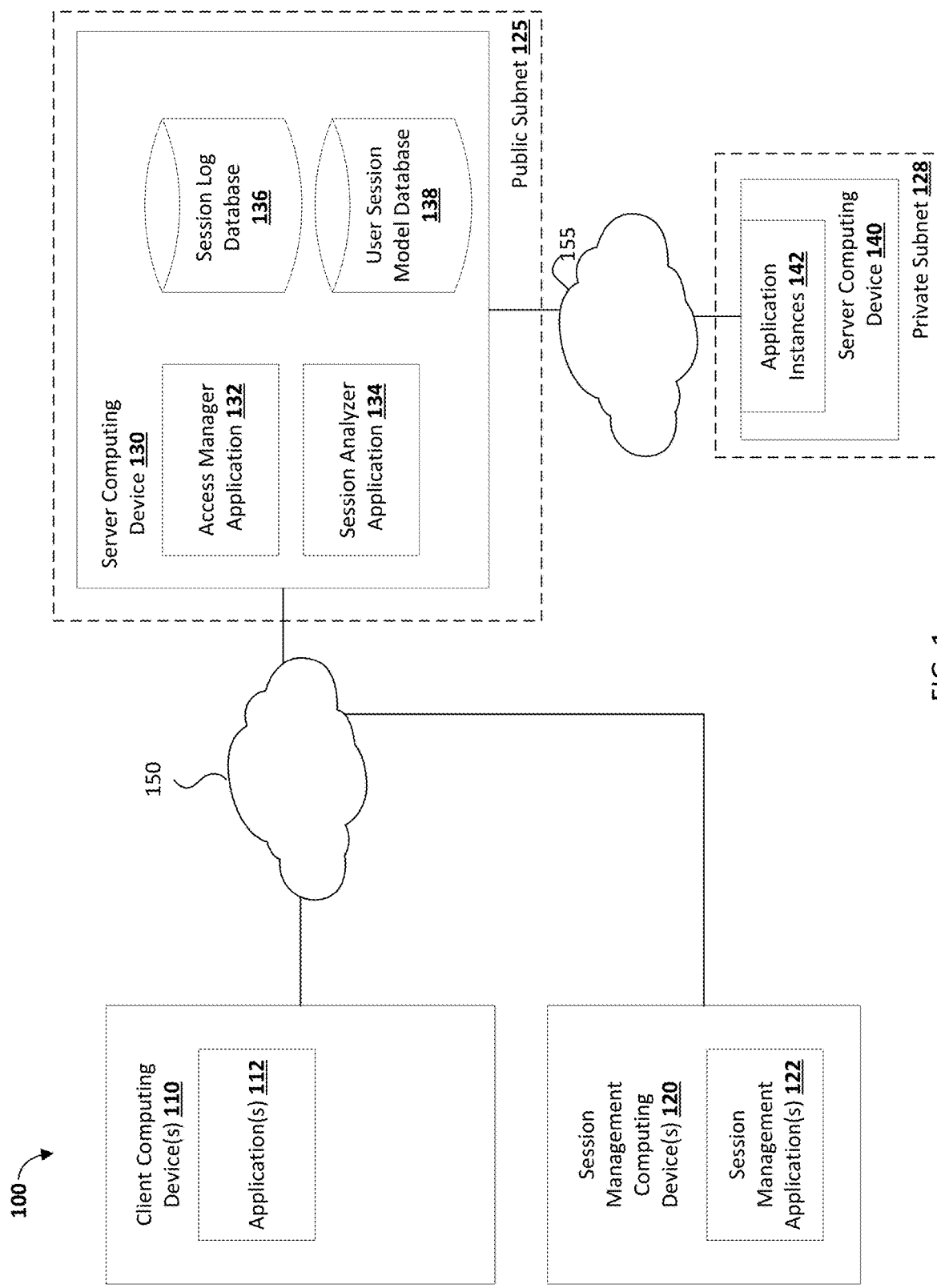
FIG. 1 is a block diagram illustrating a session management system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for managing sessions in a computing environment and performing management operations based on those sessions. As discussed above, users may access and operate network services over a network using via sessions using various network protocols that may be secure or unsecure. For example, Telnet, mobile shell, unsecured remote shell protocols, Secure Shell or Secure Socket Shell (SSH) may be protocols that provide sessions between a client application and the network service instance. For example, SSH is a network protocol that provides users secure access to a computer on a private network over an unsecured network. SSH uses the client-server model, connecting a SSH client application, which is the end where an SSH session is displayed, with an SSH server, which is the end where the SSH session runs on an application instances (e.g., a Linux instance). In a particular example, a bastion host server provides access to a private network from an external network, such as the Internet, using SSH. The bastion host server mitigates the risk of allowing SSH connections from an external network to the application instances launched in a private subnet/network of a private cloud. In a large enterprise there may be hundreds or thousands of users establishing sessions and each user may establish many sessions each day. From a management standpoint, it is very difficult to: manage these sessions, track the sessions, obtain useful information from those sessions, secure those sessions, and/or perform any management or security operations based on the sessions. Furthermore, the sessions often include both natural language and one or more formal languages making it difficult for an administrator and/or natural language processing techniques to determine context of a session.

The systems and methods of the present disclosure derive user representations from thousands of user sessions on secure computing environments. The systems and methods of the present disclosure accomplish this by intelligently parsing automatically recorded session logs of users to extract relevant information and tokenizing the enterprise's vocabulary by sampling these cleansed session logs that results in a fixed dictionary of text substrings that may be used in a domain that is a mixture of both natural language and formal language. The systems and methods of the present disclosure may then use the enterprise's fixed dictionary to build individual user representations as vectors and use the vectors to model user behavior, intent, and use of the underlying application instances. These user models may be used to perform security actions, management actions, and/or to obtain useful information from the sessions.

FIG. 1 illustrates a session management system 100 according to an embodiment of the present disclosure. The session management system 100 includes at least one client computing device 110, at least one session management computing device 120 (that may be considered a client computing device 110), and/or at least one server computing device 130 that may be included in a public subnet 125 and that may be communicatively coupled with the at least one client computing device 110 and the at least one session management computing device 120 via a network 150. The network 150, in one embodiment, may be implemented as a single network or a combination of multiple networks. For example, in various embodiments, the network 150 may include the Internet and/or one or more intranets, landline networks, wireless networks, and/or other appropriate types of communication networks. In another example, the network 150 may comprise a wireless telecommunications network (e.g., cellular phone network) adapted to communicate with other communication networks, such as the Internet. As such, the network 150 may be a public network. The server computing device 130 may be communicatively coupled with at least one server computing device 140 that is included in a private subnet 128 via a private network 155. Thus, in various embodiments, server computing device 130 may operate as a bastion host that provides access to the private network (e.g., the network 155) from a public network (e.g., the network 150).

In various embodiments, the client computing device 110 may include, for example, an external network resource that may be utilized by a user to interact with the server computing device 130 that may include an internal network resource over the network 150. The client computing device 110, in various embodiments, may be implemented using any appropriate combination of hardware and/or software configured for wired and/or wireless communication over the network 150. In various implementations, the client computing device 110 may include at least one of a wireless cellular phone, a wearable computing device, a personal computer, a laptop, etc. The client computing device 110, in one embodiment, may include an application 112 such as, for example, an external application (e.g., a client application such as, for example, a web browser, a command line interface (CLI), and/or any other client application). The application 112 may be utilized by the user to display a session with an application instance 142 on the server computing device 140. The session may be provided via the network 150, via an access manager application 132 on the server computing device 130, and via the network 155. For example, the application 112 may be used by the user of the client computing device 110 to run an Secure Shell (SSH) instance provided by the application instance 142 running on the server computing device 140.

The client computing device 110 may also include at least one computing device identifier, which may be implemented, for example, as an IP address, operating system registry entries, cookies associated with the application 112, identifiers associated with hardware of the client computing device 110 (e.g., a media control access (MAC) address), network domain information, and/or various other appropriate identifiers. Even though only one client computing device 110 is shown in FIG. 1, it is contemplated that one or more external network resources (each similar to the client computing device 110) may be communicatively coupled with the server computing device 130 via the network 150 within the session management system 100.

In various embodiments, the session management computing device 120 may include, for example, an external network resource that may be utilized by a user to interact with the server computing device 130 that may include an internal network resource over the network 150. The session management computing device 120, in various embodiments, may be implemented using any appropriate combination of hardware and/or software configured for wired and/or wireless communication over the network 150. In various implementations, the session management computing device 120 may include at least one of a wireless cellular phone, a wearable computing device, a personal computer, a laptop, etc.

The session management computing device 120, in one embodiment, may include a session management application 122 such as, for example, an external application (e.g., a client application such as, for example, a web browser, a command line interface (CLI), and/or any other client application), which may be utilized by the user to manage session logs and manage user session models included at the server computing device 130. However, as discussed further below, the session management application 122 may include some or all of the instructions provided by the session analyzer application 134. In various examples, the session management application 122 may be used by the user of the session management computing device 120 to communicate with and/or provide instruction with the session analyzer application 134 included on the server computing device 130. Even though only one session management computing device 120 is shown in FIG. 1, it is contemplated that one or more external network resources (each similar to the session management computing device 120) may be communicatively coupled with the server computing device 130 via the network 150 within the session management system 100. In various embodiments, the session management computing device 120 may be provided by a client computing device 110 and the use of that client computing device 110 using administrative credentials to access various management application instances included in the application instances 142.

The server computing device 130, in various embodiments, may be maintained by an operating entity (or in some cases, by a partner of an operating entity that processes transactions on behalf of the operating entity). Even though only one server computing device 130 is shown in FIG. 1, it has been contemplated that one or more internal network resources (each similar to the server computing device 130) may be accessible to one or more external network resources that are provided by the client computing device 110 via the network 150 within the session management system 100.

The server computing device 130, in one embodiment, may include an access manager application 132, which may be configured to provide, generate, and/or establish a session between an application instance 142 included on the server computing device 140 and the application 112 on the client computing device 110 and/or the session management application 122 on the session management computing device 120. For example, the access manager application 132 may include a suite of securing networking utilities (e.g., such as OpenSSH for an SSH protocol implementation that provides the session) that provide a secure channel over the network 150 and the network 155 for sessions between the application instance 142 and the application 112. However, other protocols (e.g., secure or unsecure) that establish sessions between the client computing device 110 and the server computing device 140 (with or without the server computing device 130 and/or with or without the server computing device 130 being implemented as a bastion host) may be contemplated and fall under the scope of the present disclosure.

As described above, the server computing device 130 may provide and operate as a bastion host. The server computing device 130, in one embodiment, may include at least one computing device identifier, which may identify the server computing device 130 and/or the access manager application 132 being accessed by the application 112. In one implementation, the computing device identifier may include a server identifier (e.g. hostname, IP address), application identifier (e.g., URL, application name), and/or other identifier that identifies a server computing device 130 that would be apparent to one of skill in the art in possession of the present disclosure. The computing device identifier may include attributes related to the server computing device 130, such as identification information (e.g., a serial number, a location address, GPS coordinates, a network identification number, etc.).

The server computing device 130, in one embodiment, may be configured to access and/or maintain data generated by the access manager application 132 in a session log database 136. For example, the session log database 136 may include records such as session logs of sessions provided, and/or generated via the access manager application 132. The session logs may include recordings of user interactions of a user during a session with an application instance 142 in the server computing device 140. Each session log included in the session log database 136 may be associated with a user identifier for a user that initiated a particular session. However, other session log databases 136 may be contemplated. While the session log database 136 is illustrated as a single database provided in the server computing device 130, one of skill in the art in possession of the present disclosure will recognize that the session log database 136 may include a plurality of databases, and/or may be directly coupled to the server computing device 130 and/or coupled to the server computing device 130 via the network 150. Further still, while the records are described as session logs, processing other content objects (e.g., text files) using the systems and methods of the present disclosure will fall under the scope of the present disclosure as well.

The server computing device 130, in various embodiments, may include a session analyzer application 134, which may be configured to analyze the session logs stored in the session log database 136 and/or generate user session models stored in a user session model database 138, as discussed in further detail below. For example, the session analyzer application 134 may process session logs gathered from the session log database 136 to generate user models, perform security actions, and/or other session management actions that would be apparent to one of skill in the art in possession of the present disclosure. Furthermore, the session analyzer application 134 may be implemented as executable computer instructions stored on a computer-readable medium.

In various embodiments, the session analyzer application 134 may be configured to access and/or maintain data needed by the session analyzer application 134 in a user session model database 138. For example, the user session model database 138 may include various data structure dictionaries used by the session analyzer application 134 in vectorizing a session log and generating a user model based on the session vector representation, as discussed in more detail below. While the user session model database 138 is illustrated as a single database provided in the server computing device 130, one of skill in the art in possession of the present disclosure will recognize that the user session model database 138 may include a plurality of databases, and/or may be directly coupled to the server computing device 130 and/or coupled to the server computing device 130 via the network 150. Furthermore, while the session analyzer application 134 and the access manager application 132 are illustrated as being provided by the server computing device 130, one of skill in the art in possession of the present disclosure will recognize that separate server computing devices that are coupled to each other via the network 150 may provide the session analyzer application 134 and/or the access manager application 132. While a specific session management system 100 has been illustrated and described, one of skill in the art in possession of the present disclosure will recognize that the session management system 100 of the present disclosure may include a variety of components and component configurations while remaining within the scope of the present disclosure as well.

Figure 2:
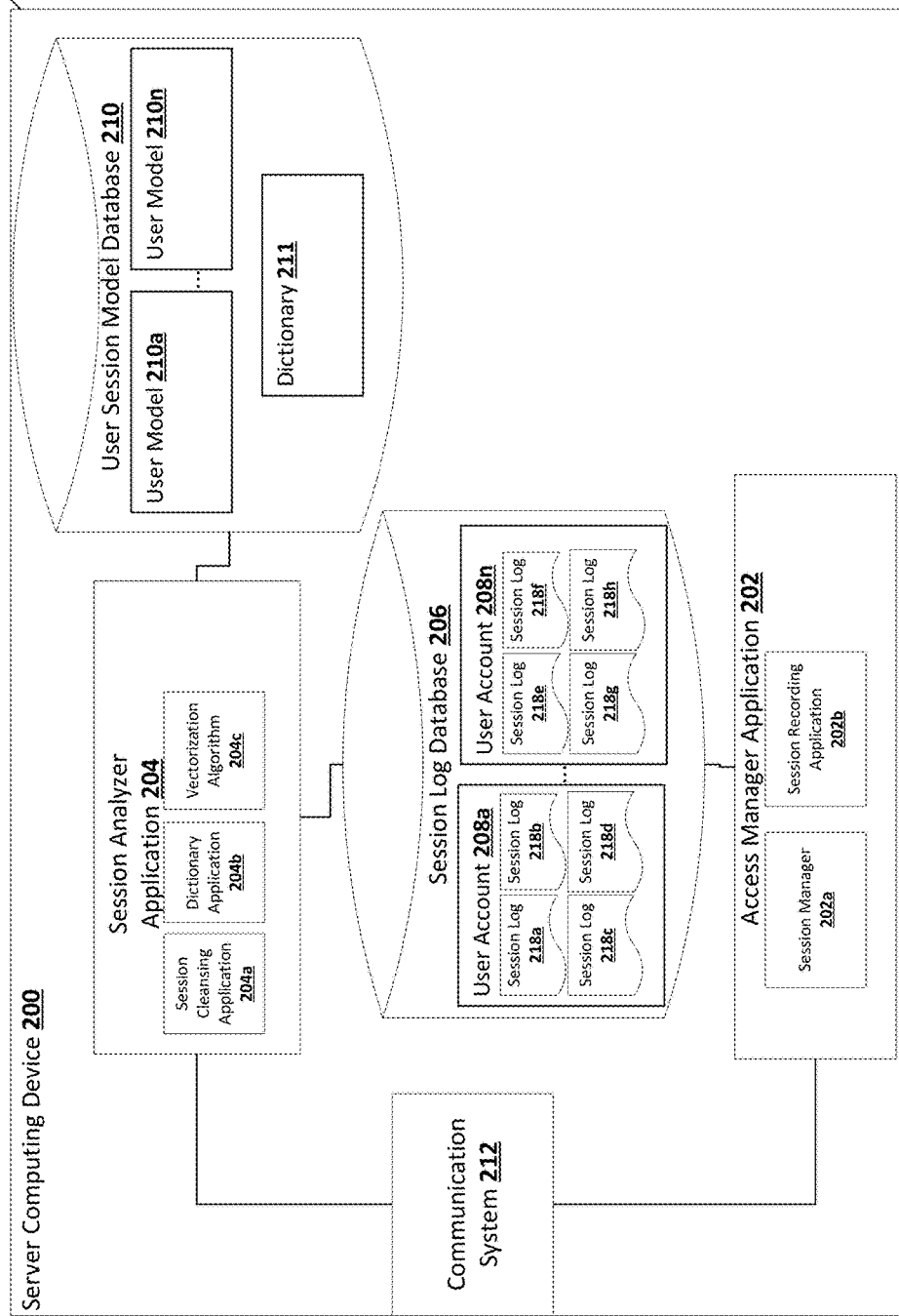
FIG. 2 is a block diagram illustrating a server computing device of the session management system of FIG. 1 according to an embodiment of the present disclosure.

Referring now to FIG. 2, an embodiment of a server computing device 200 is illustrated. In an embodiment, the server computing device 200 may be the server computing device 130 discussed above. In the illustrated embodiment, the server computing device 200 includes a chassis 201 that houses the components of the server computing device 200, only some of which are illustrated in FIG. 2. For example, the chassis 201 may house a processing system (not illustrated) and a non-transitory memory system (not illustrated) that includes instructions that, when executed by the processing system, cause the processing system to provide an access manager application 202 (that may be the access manager application 132 of FIG. 1) that is configured to perform the functions of the access manager application and/or the server computing devices discussed below. In various embodiments, the access manager application 202 may include one or more sub-applications such as a session manager 202*a*, a session recording application 202*b*, and/or any other sub-application that would be apparent to one of skill in the art in possession of the present disclosure that may be configured to perform the functions of the session manager, the session recording application, and/or server computing devices discussed below.

The non-transitory memory system (not illustrated) may also include instructions that, when executed by the processing system, cause the processing system to provide a session analyzer application 204 (that may be the session analyzer application 134 of FIG. 1) that is configured to perform the functions of the session analyzer application and/or the server computing devices discussed below. In various embodiments, the session analyzer application 204 may include one or more sub-applications such as a session cleansing application 204*a*, a dictionary application 204*b*, a vectorization algorithm 204*c*, and/or any other sub-application that would be apparent to one of skill in the art in possession of the present disclosure that may be configured to perform the functions of the session cleansing applications, the dictionary applications, the vectorization algorithms, and/or server computing devices discussed below.

Furthermore, the chassis 201 may also house a storage device (not illustrated) that is coupled to the access manager application 202 (e.g., via a coupling between the storage device and the processing system) and that is coupled to the session analyzer application 204 (e.g., via a coupling between the storage device and the processing system). The storage device may provide a session log database 206 (that may be the session log database 136 of FIG. 1) that is configured to store session logs 218a-218h that may be associated with one or more user accounts (e.g., a user accounts 208a and/or up to a user account 208n) and/or one or more user identifiers. In other embodiments, the session log database 206 may also store other data and/or instructions utilized by the access manager application 202 in order to provide the functionality discussed below. The storage device may also provide a user session model database 210 (that may be the user session model database 138 of FIG. 1) that is configured to store user models 210a-210n that may be associated with a respective user account (e.g., the user accounts 208a and/or up to 208n) and/or a respective user identifier. In other embodiments, the user session model database 208 may also store other data and/or instructions utilized by the session analyzer application 204 in order to provide the functionality discussed below. For example, the user session model database 208 may include an entity specific dictionary 211 (e.g., a fixed/finite dictionary), discussed in further detail below, used for converting a session log into a session vector representation. For example, the dictionary 211 may include alphanumeric strings, morphemes, words, sentences, and/or other syntax objects that are frequently used by an enterprise.

The chassis 201 also houses the communication system 212 that is coupled to the access manager application 202 and the session analyzer application 204 (e.g., via a coupling between the communication system 222 and the processing system), and that may include a network interface controller (NIC), programmable Smart NIC, a wireless communication subsystem, and/or other communication subsystems known in the art. The communication system 212 may be used to communicate with the network 150 and the network 155 of FIG. 1. Also, while the session log database 206 and the user session model database 210 are illustrated as stored in the one or more storage devices that are housed in the chassis 201, one of skill in the art in possession of the present disclosure will recognize that the session log database 206 and the user session model database 210 may be stored in a storage device that is located outside the chassis 201 and that is accessible to the access manager application 202 and the session analyzer application 204 through a network (e.g., the network 150 of FIG. 1) via the communication system 212.

As will be appreciated by one of skill in the art in possession of the present disclosure, the storage device and the communication system 212 may enable the access manager application 202 and/or the session analyzer application 204 to communicate with the session log database 206 and the user session model database 210 without having to provide those databases directly on the server computing device 200. However, while specific components of the server computing device 200 have been illustrated and described, one of skill in the art in possession of the present disclosure will recognize that other components may be included in the chassis 201 and utilized to perform the functionality described below, as well as conventional server computing device functionality, while remaining within the scope of the present disclosure.

Figure 3:
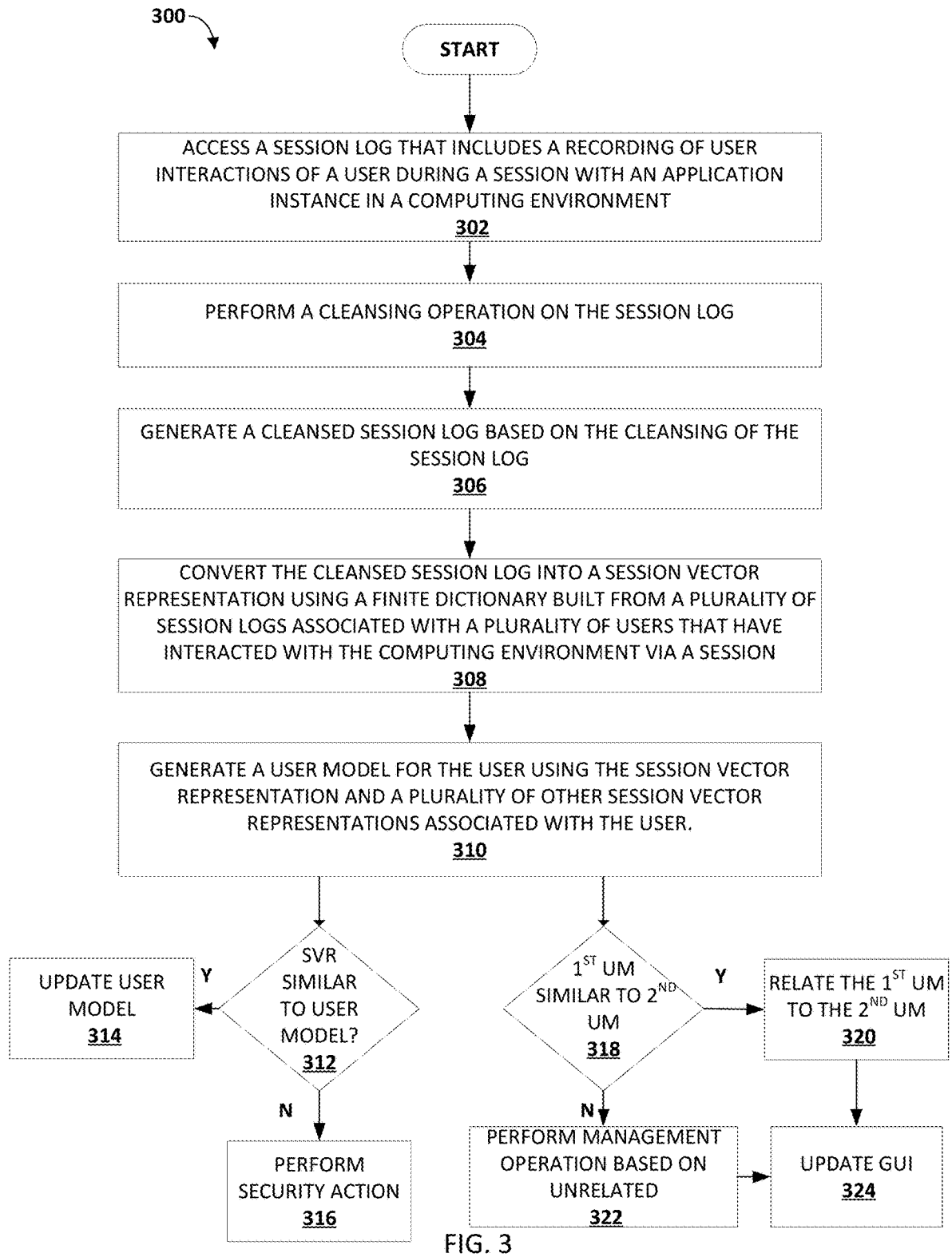
FIG. 3 is a flowchart illustrating a method of managing sessions according to an embodiment of the present disclosure.

Referring now to FIG. 3, a method 300 for managing sessions and session logs is illustrated according to an embodiment of the present disclosure. In various embodiments, the server computing device 130 may execute some or all of the elements of the method 300. However, it is contemplated that the client computing device 110, the session management computing device 120, and/or the server computing device 140 may execute some or all of the elements of the method 300 according to various embodiments. In addition, the blocks or operations may be omitted or performed in a different order, as appropriate. The method 300 begins at block 302 where a session log that includes a recording of user interactions of a user during a session with an application instance in a computing environment is accessed. In an embodiment, at block 302, the session analyzer application 134/204 may access a session log (e.g., a session log 218a associated with a user account 208a (e.g., a user identifier) of FIG. 2).

Figure 4:
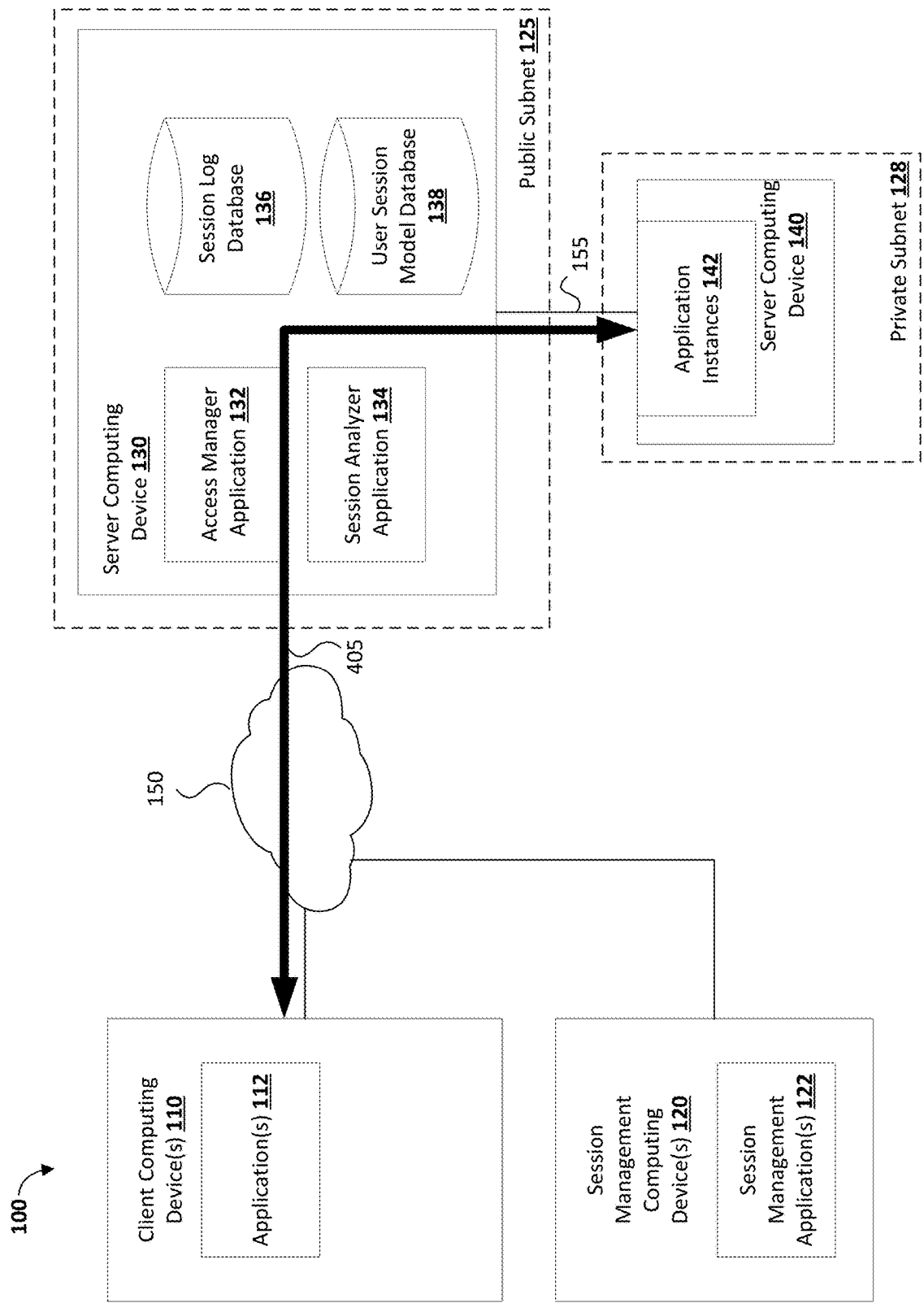
FIG. 4 is a block diagram illustrating a session management system of FIG. 1 and used during the method of FIG. 3 illustrating an initiation of a session according to an embodiment of the present disclosure.

In various embodiments, prior to block 302 of method 300 and with reference to FIG. 2, each of the session logs 218a-218h stored in the session log database 206 may have been recorded by the session recording application 202b included in the access manager application 202. With reference to FIG. 4 that includes the session management system 100 of FIG. 1, the session manager 202a included in the access manager application 132/202 may establish a session 405 (denoted by the bolden arrows) between the application 112 on the client computing device 110 and the application instance 142 included on the server computing device 140. As discussed above, the session management system 100 may provide an SSH computing environment/architecture where the server computing device 130 is a provided as a bastion host that provides access to the private network (e.g., the network 155) from a public network (e.g., the network 150). Often the bastion host is the only point of access to the private network 155 and the private subnet 128. A bastion host may be a special-purpose computer specifically designed and configured to withstand security threats. The bastion host generally hosts a single application or process, for example, a proxy server or load balancer, and all other services are removed or limited to reduce the points of access to the bastion host. The bastion host is often secured primarily due to its location and purpose, which is either on the outside of a firewall (included in the public subnet 125 as illustrated in FIG. 4). However, in other embodiments, the bastion host may be included inside of the private subnet 128 and may provide access from untrusted networks (e.g., the network 150) or computers (e.g., the client computing device 110 and/or the session management computing device 120) to the private subnet 128.

Continuing with the specific SSH example, the application instances 142 (e.g., Linux instances) may be provided at the server computing device 140 that is included in the private subnet 128 that is not publicly accessible. The application instances 142 are set up with a security group that allows SSH access from the security group attached to the server computing device 130 (e.g., an instance of the access manager application 132/202) running the bastion host. Bastion host users that belong to the security group connect to the bastion host via the application 112 included on the client computing device 110 and/or the session management application 122 on the session management computing device 120 to connect to the application instances 142. A session, such as the session 405, may be established between the application 112 and the application instance 142 using the SSH protocol. For example, the session manager 202a included in the access manager application 132/202 of the computing device 130/200 may include OpenSSH that runs an interactive shell when the application 112 connects to one of the application instances 142 establishing the SSH session. As would be appreciated by one of skill in the art, an interactive shell may read commands from user input on a teletypewriter (tty). Among other things, an interactive shell may read startup files on activation, may display a prompt, and/or may enable job control by default. As such, the user can interact with the shell.

To record the session between the application 112 and the application instance 142, the session recording application 202b included in the access manager application 202 of FIG. 2 may record the session. For example, the session recording application 202b may include a custom script such that the session manager 202a (e.g., OpenSSH) executes that custom script that wraps the interactive shell ran by the session manager 202a into a script command. By doing so, the execution of the script command may record and/or otherwise store everything displayed by application 112 at the client computing device 110 including keyboard inputs and full-screen applications. The recording results in a record such as a session log (e.g., the session logs 218a-218n) that are associated with a particular user or user identifier used when the user logged in to the server computing device 130 to access the application instance 142. In various embodiments, each session log 218a-218n may include two sub-log files where a first sub-log file includes the data displayed at the client computing device 110 and the second sub-log file includes timing data that enables replay with realistic typing and output delays.

Referring to FIG. 5, an example session log 500 is illustrated that may be an example of one of the session logs 218a-218n of FIG. 2. As illustrated in FIG. 5, the session log 500 includes a plurality of sentences 502 where each line of the session log 500 may be a sentence 502. Each sentence 502 may include content 504 that may include text content 504a provided by alphanumeric content including symbols. The content 504 may be structured as combination of both formal language and natural language. The formal language may include multiple formal languages in each session. The content 504 may also include one or more control sequences 504b (e.g., "^M", "^H", "^[[K") that may have been a result, for example, any backspaces made by the user, other keyboard strokes that do not typically result in a graphical symbol during the session, any open source control sequences, and/or any other actions causing control sequences to be generated and displayed that would be apparent to one of skill in the art of the present disclosure. As discussed above, the session log 500 may be distinguished from other documents where conventional natural language processing (NLP) may be used to determine context of a document. For example, the relatively short "sentences" 502 and the combination of one or more formal languages and/or natural language used in each session may make it difficult for conventional NLP algorithms to process the session log 500.

With respect to block 302 of method 300 of FIG. 3, the session analyzer application 134/204 may obtain the session log 218a/500 from the session log database 136/206. In some embodiments, the session log 218/500 may have been stored in the session log database 206 after the session 405 of FIG. 4 has completed. However, in other embodiments, the session analyzer application 134/204 may obtain a session log that includes a snapshot of a session that is being recorded in real-time. While the session analyzer application 134/204 and the session log database 136/206 are provided on the server computing device 130/200, in other embodiments, session log database 136/206 and the session analyzer application 134/204 may be located elsewhere. For example, a replay of an SSH session on the bastion host may not be practical because of strict avoidance of using the privileged user account to access the SSH session and because the bastion host may not have read permissions on the session logs in a session log database 136/206 that are located outside of the bastion host and the session logs that are older than a day may be deleted from the bastion host. Instead, the session analyzer application 134/204 may be provided by another application instance of the application instances 142 on the server computing device 140 with that application instance having sufficient permissions on the session log database 136/206 to download and replay the session logs 218a-218n.

The method 300 then proceeds to block 304 where a cleansing operation is performed on the session log. In an embodiment, at block 304, the session analyzer application 134/204 may perform a cleansing operation on the raw session log 218a/500. For example, the session cleansing application 204a provided by the session analyzer application 134/204 may operate to remove any control sequences (e.g., control sequences 504b) from the content 504 of each sentence 502 included in the session log 500. The session cleansing application 204a may reference a control sequence depository that includes a list of control sequences for which the session cleansing application 204a uses to search and identify the control sequences 504b in the session log 500. The session cleansing application 204a may remove the control sequences 504b from the session log 500. In other embodiments, other data cleansing operations may be used to correct or remove errors in the content 504, remove duplicate content, remove inconsistent content, and/or perform any other content cleansing operations that would be apparent to one of skill in the art in possession of the present disclosure.

The method 300 then proceeds to block 306, where a cleansed session log is generated based on the cleansing of the session log. In an embodiment, at block 306, the cleansing of the session log 218a/500 may result in the generation of a cleaned session log. For example, and with reference to FIG. 6, the session cleansing application 204a may generate a cleansed session log 600. As can be seen from FIG. 6, the control sequences 504b may have been identified and removed from the session log 218a/500 leaving the text content 504a.

The method 300 then proceeds to block 308 where the cleansed session log is converted into a session vector representation using a finite dictionary built from a plurality of session logs associated with a plurality of users that have interacted with the computing environment. In an embodiment at block 308, a vectorization algorithm 204c provided by the session analyzer application 134/204 may convert the cleansed session log to a session vector representation using a finite dictionary (e.g., the dictionary 211). In various embodiments, because the sessions are a combination of both natural language and one or more formal languages, a tokenization vocabulary could be infinite because formal languages may have an infinite number of terms (e.g., x1, x2, x3, xn, could all be terms). As such, conventional natural language processing vocabularies may not capture the intent of each session very accurately. Therefore, a finite dictionary or fixed dictionary (e.g., the dictionary 211 stored in the user session model database 210) may be built that is specific to the entity or enterprise that is associated with the session management system 100. For example, the dictionary 211 may include alphanumeric strings, morphemes, words, sentences, and/or other syntax objects that are frequently used by an enterprise but are language agnostic such that formal languages may be represented by the dictionary 211.

The dictionary 211 may include both formal language tokens and natural language tokens that may be provided by a system administrator. However, in other embodiments, the dictionary 211 may be built by searching a corpus of session logs (e.g., the session logs 218a-218h) for common terms and/or terms that may be important to the entity. For example, the dictionary application 204b included in the session analyzer application 134/204 may perform one or more decluttering techniques to reduce the corpus size of the text strings in the dictionary 211 such as, for example, regex for targeted pruning, stemming, lemmazation, Parts-Of-Speech (POS) tags, name entities, noun phrases, noun chunks, and/or any other decluttering techniques that will reduce the corpus size of the text strings that include both formal and natural language.

The dictionary application 204b may further operate to apply a sub string tokenization algorithm to the corpus of session logs. For example, the vectorization algorithm 204c may include SentencePiece which may support Byte-Pair Encoding (BPE) or Unigram language model that may be used by the dictionary application 204b to capture text strings that appear frequently enough to determine the importance of the text string but also diverse enough between the sub strings to minimize recapturing the same information and to build up a useful, diverse sub-word dictionary that is a fixed size according to a predetermined dictionary size.

Subsequent to the dictionary 211 being established, the session analyzer application 134/204 may convert the cleansed session log 600 of FIG. 6 to a session vector representation using the dictionary 211. For example, the session analyzer application 134/204 may further declutter the cleansed session log 600 using decluttering techniques used to generate the dictionary 211. The session analyzer application 134/204 may apply the vectorization algorithm 204c to the decluttered session log 218a/500 to obtain a session vector representation for that session log 218a/500. For example, SentencePiece may be used to vectorize the substrings in each sentence 502 of the cleansed session log 600. Those vector representations of the substrings may be averaged to obtain vectors for the words of the sentence 502 or the vector of the sentence itself. In some embodiments, a running window technique may be used to obtain a vector for the sentence 502 by including one or more lines above the current sentence 502 and/or one or more lines below the current sentence 502 and averaging the vectors of those lines to obtain a vector for the current sentence 502. The average of the vectors of the sentences may then be averaged to obtain a session vector representation of the session log 218a/500.

While SentencePiece is described as vectorizing the session logs 218a-218n and using a language agnostic dictionary generator (e.g., BPE or Unigram), one of skill in the art in possession of the present disclosure will recognize that other tokenization/vectorization algorithms may be used obtain a session vectorization representation of the session log 218a/500. For example, the vectorization algorithm 204c may include a Doc2Vec algorithm, a Sentence2Vec algorithm, a Word2Vec algorithm, a FastText algorithm, and/or any other tokenization/vectorization algorithm that would be apparent to one of skill in the art in possession of the present disclosure that may be used to generate a session vector representation of the session log 218a by first converting a portion of the text content (e.g., words, sentences) to vectors using the dictionary 211 and averaging those vectors to obtain a session vector representation for that session log. The dictionary 211 for these algorithms may be built by applying a sub string tokenization algorithm to the corpus of session logs, as discussed above.

Referring now to FIG. 7, a vector graph 700 is illustrated. The vector graph 700 illustrates the session vector representation 702 for the session log 218a/500 discussed in the above example. As illustrated, the session vector representation 702 may include n-dimensions (e.g., "term 1", "term 2", and up to "term n").

Referring back to FIG. 3, method 300 then proceeds to block 310 where a user model for the user is generated using the session vector representation and a plurality of other session vector representations associated with the user. In an embodiment, at block 310, the user model generator 204d included in the session analyzer application 134/204 may generate a user model for the user using the session vector representation determined in block 308 and a plurality of other session vector representations associated with the user. For example, blocks 302-308 of method 300 may be performed on the session logs 218b, 218c, and 218d to generate respective session vector representations for those session logs 218b-218d.

Figure 8:
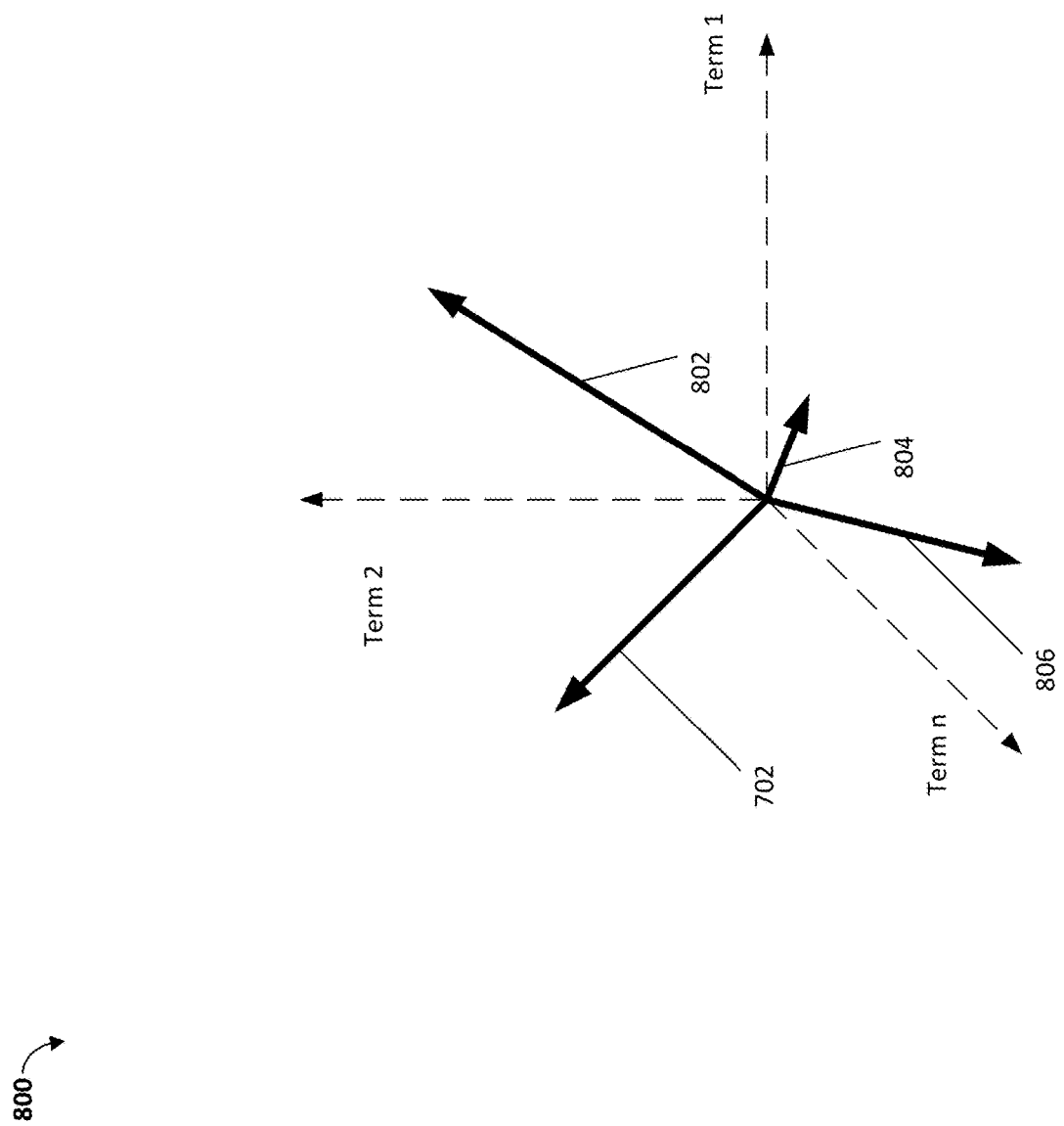
FIG. 8 illustrates a graph of a plurality of session vector representations of session logs associated with a user that is associated with the session log of FIG. 5 during the method of FIG. 3 according to an embodiment of the present disclosure.

Referring to FIG. 8, a vector graph 800 is illustrated. As illustrated, the vector graph 800 illustrates the session vector representation 702 associated with the session log 218a, a session vector representation 802 that is associated with the session log 218b, a session vector representation 804 that is associated with the session log 218c, and a session vector representation 806 that is associated with the session log 218d. While only four session vector representations 702, 802, 804, and 806 are illustrated, one of skill in the art in possession of the present disclosure will recognize that the number of session logs and respective session vector representations may be any number and a user may generate 1000s of session logs.

Figure 9:
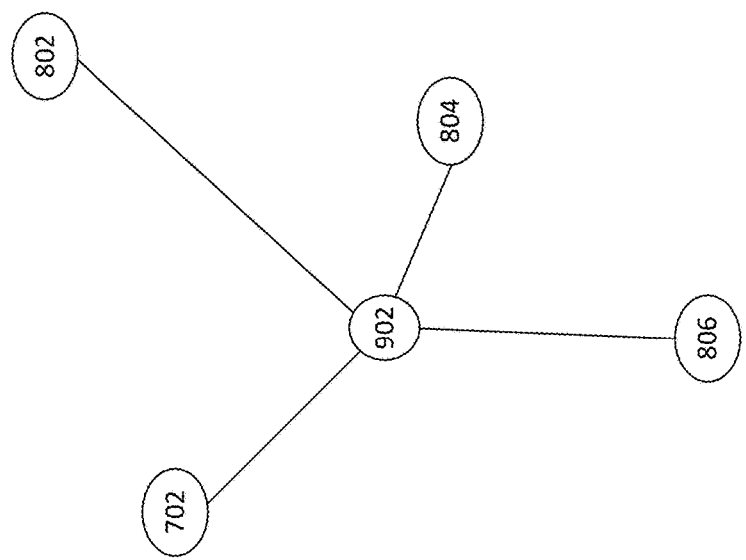
FIG. 9 illustrates a user model generated from the plurality of session vector representations of FIG. 8 and associated with the user during the method of FIG. 3 according to an embodiment of the present disclosure.

The average of the session vector representations 702, 802, 804, and 806 may be calculated to determine a user vector 902 as illustrated in a user model 900 of FIG. 9 that represents a particular user (e.g., the user of the user account 208a) of the session management system 100. The user model 900 may be stored in the user session model database 210. For example, user model 900 may be the user model 210a that corresponds with the user associated with the session logs 218a-218d associated with the user account 208a of FIG. 2. Blocks 302-310 of method 300 may be repeated for each user and set of session logs associated with that user to generate a user model for each user of the session management system 100. For example, the session logs 218e-218h associated with the user account 208n may be used to generate the user model 210n stored in the user session model database 210. Once one or more of the user models 210a-210n are generated, an administrator may perform one or more management actions based using one or more of the user models 210a-210n.

Referring back to FIG. 3, in some embodiments, the method 300 may then proceed to decision block 312 where it is determined whether a session vector representation of a new session log satisfies a predetermined similarity threshold with a user model associated with a user account through which the session was initiated. For example, a session may be initiated using user credentials associated with the user that is associated with the user account 208a and user model

Figure 10:
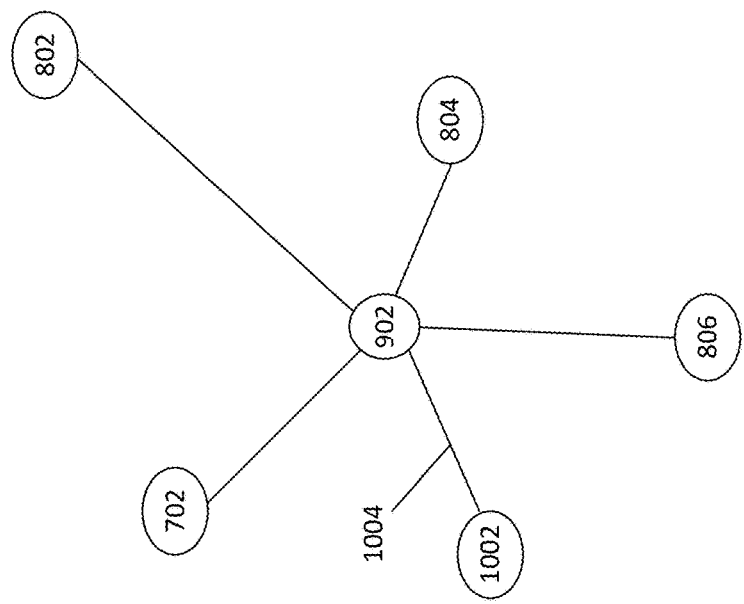
FIG. 10 illustrates the user model of FIG. 9 used to determine whether a new session is associated with the user associated with the user model during the method of FIG. 3 according to an embodiment of the present disclosure.

210*a*. The session vector representation of the session log generated for the session or for a part of the session may be generated at block 308 as discussed above. The session analyzer application 134/204 may determine whether the session vector representation of the session log satisfies a predetermined similarity threshold with the user model 210*a*. For example and with reference to FIG. 10, a session vector representation 1002 of a new session log in relation to the user vector 902 may be represented by a distance 1004. That distance 1004 may be compared to a predetermined threshold distance to determine whether there is a high probability or not that the session associated with that new session log is or was being conducted by the actual user of the user account that initiated the session.

If the session vector representation 1002 of the new session log satisfies the predetermined similarity threshold, the method 300 may proceed to block 314 where the session vector representation 1002 is used to update the user model 210*a* according to the techniques used at block 310 of method 300. However, if the session vector representation of the new session log does not satisfy the predetermined similarity threshold, the method 300 may then proceed to block 316 where a security action is performed. For example, while the user is conducting the session, the session analyzer application 204 may halt the session and request that the user provide a step-up authentication. In other embodiments, the session analyzer application 204 may contact the user and/or an administrator to ensure that it is the user that is performing the session or that the user performed the session in the past. In other embodiments, the security action may depend on the distance that the session vector representation 1002 is from user vector 902. For example, the further away the session vector representation 1002 is from the predetermined similarity threshold, the greater the security action is performed. For example, if the distances 1004 is of a value such that there is a very low probability that the session is being performed by the user, then the session and/or user account may be locked. However, if there is a relatively higher probability that the session is being performed or was performed by the user, then a step-up authentication process may be provided, or user rights may be diminished.

Figure 11:
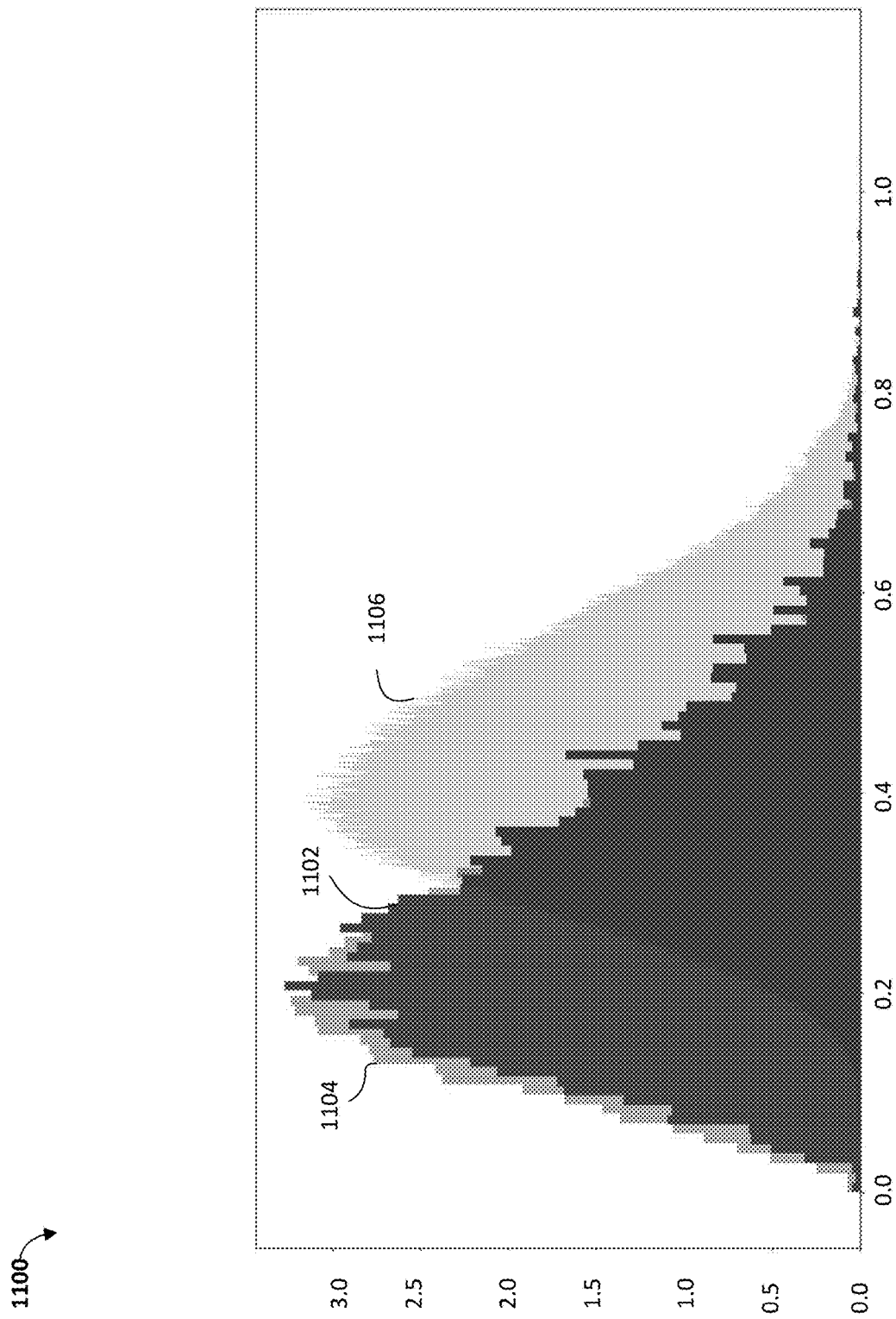
FIG. 11 illustrates a graph that is used to display user session similarity to random sessions during the method of FIG. 3 according to an embodiment of the present disclosure.

While blocks 312-316 may be used to perform a security action based on a single session, in other embodiments, more than one session vector representation may be used to determine whether a set of session logs is associated with or not associated with a particular user actually belong to that user or to determine whether there is a change in user behavior over time to track which application instances 142 may be becoming less or more relevant to that user. With reference to FIG. 11, a graph 1100 that is used to display user session similarity to random sessions is illustrated. The x-axis may represent the similarity of a session vector representation to a user vector with "0" indicating that the session vector representation is identical to the user vector 902 of the user model 900 and "1" indicating the least similar or no similarity between a given session vector representation and the user vector 902. The y-axis represents the number of session logs or more particularly the percentage of session logs. Graph 1102 represents the sessions logs that were used to generate the user model 900 and the user vector 902 of FIG. 9. Graph 1104 illustrates new sessions by the user that were not used to model the user. Graph 1106 illustrates session logs from random users that may or may not include the user.

As can be seen from the graphs 1102 and 1106, session vector representations that are between 0-0.3 are more than likely to belong to the user while session vector representations that are greater than approximately 0.3 are more than likely to belong to another user. As can also be seen from the graphs 1102 and 1104. The new sessions by the user in graph 1104 closely correlate with the graph 1102 used to model the user. As such, an administrator may determine that the user is essentially performing similar activities to what that user did in the past, which may also indicate that there likely have been little to no security issues with that user's account. If there was a major shift between the graphs 1102 and 1104, the administrator may deduce that there may have been security issues with the user account and/or that the user's daily tasks/projects have changed. This may be used to better understand which application instances 142 that the user is using and which application instances 142 may no longer be relevant to the user. This may be helpful when auditing which application instances 142 may no longer be relevant to a user and/or group of users such that licenses may be reduced for those application instances 142. While specific actions have been discussed that may be performed when comparing a current session log or a set of session logs to a user model, one of skill in the art in possession of the present disclosure will recognize that other management actions may be contemplated when comparing a current session log and/or set of session logs to a user model and/or user models.

In other alternative embodiments, the method 300 may proceed from block 310 to decision block 318 where it is determined whether the user model satisfies a predetermined similarity threshold with another user model. In an embodiment, at decision block 318, the session analyzer application 134/204 may determine whether the user model 210*a* and the user model 210*n* satisfy the predetermined similarity threshold. For example, the distance between the user vector (e.g., the user vector 902) of the user model 210*a*/900 and the user vector of the user model 210*n* may be determined. If that distance satisfies a predetermined distance threshold (e.g., is less than or equal to a predefined distance), then the predetermined similarity threshold may be satisfied.

If the predetermined similarity threshold is satisfied, then the method 300 may proceed to block 320 where a management operation that relates the user model 210*a* to the user model 210*n* is performed. For example, at block 320, the session analyzer application 134/204 may cause the user model 210*a* to be associated with the user model 210*n*, which may indicate to an administrator that the users associated with the user model 210*a* and the user model 210*n* are likely on the same team or have similar positions within the enterprise. The administrator may be able to track the changes in the users' session use over time to see how the team uses resources such that adjustments can be made to the application resources. For example, application instances may be added or removed, resources (e.g., processing, memory, storage, etc.) may be allocated to necessary application instances, and/or other adjustments to hardware required to run the application instances 142 that would be apparent to one of skill in the art in possession of the present disclosure.

If, at decision block 318, the distance does not satisfy a predetermined distance threshold (e.g., is less than or equal to a predefined distance), then the predetermined similarity threshold may not be satisfied. If the predetermined similarity threshold is not satisfied, then the method 300 may proceed to block 322 where a management operation that indicates to an administrator that the user model 210*a* is not related to the user model 210*n* is performed. For example, at block 322, the session analyzer application 134/204 may cause an alert or some other form of indication to be outputted on a display at the session management computing device 120 via the session management application. In some embodiments, at block 324, the session analyzer application 134 and/or the session management application 122, may generate a graphical representation (e.g., a graphical user interface (GUI)) of the groups of users based on each user's user model.

Figure 12:
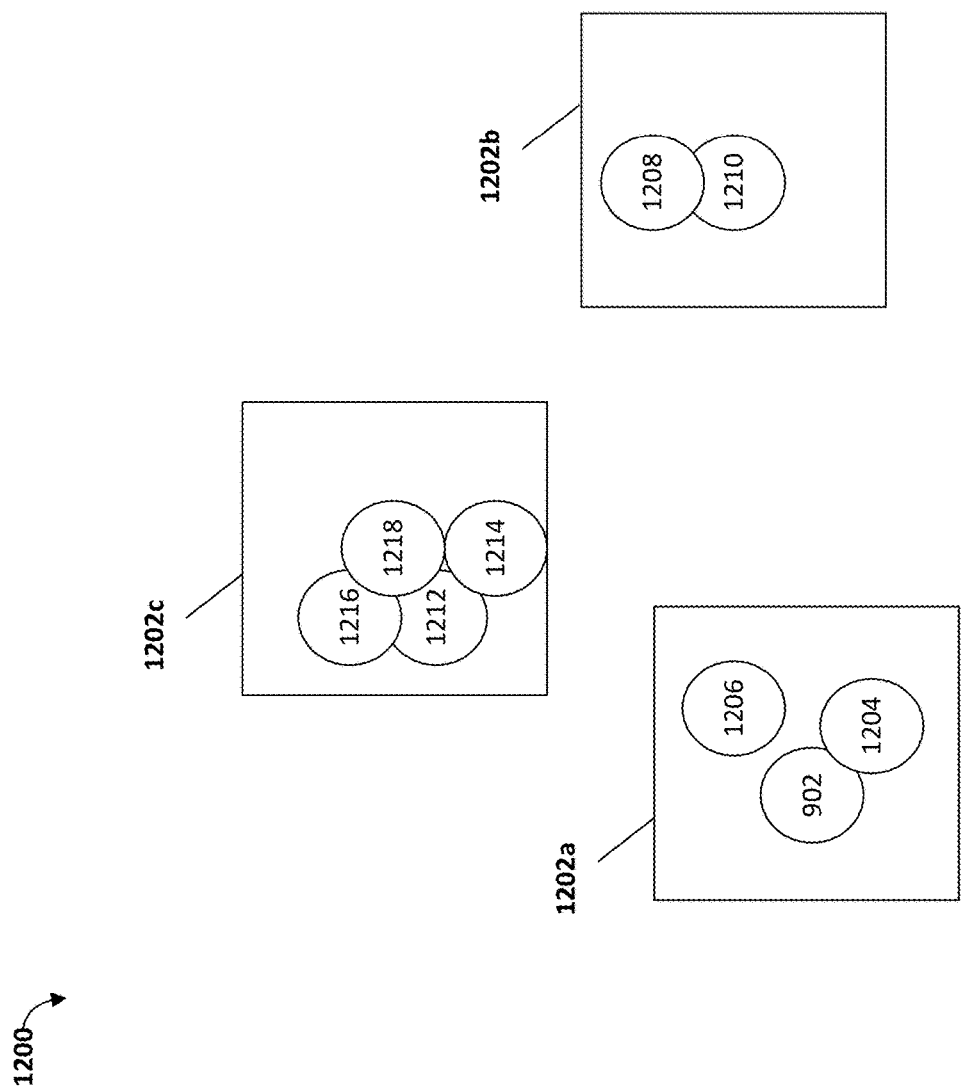
FIG. 12 illustrates a graphical user interface of a graph grouping related users according to their user models during the method of FIG. 3 according to an embodiment of the present disclosure.

Referring now to FIG. 12, a graphical representation 1200 of user groups that is displayed at the session management computing device 120 is illustrated. As illustrated in FIG. 12, the user vector 902 may be grouped in a group 1202*a* with user vectors 1204 and 1206. The graphical representation 1200 may also display a group 1202*b* that includes user vectors 1208 and 1210. Furthermore, the graphical representation 1200 may also display a group 1202*c* that includes user vectors 1212, 1214, 1216, and 1218. As discussed above, the user vectors 902, 1204, 1206, 1208, 1210, 1212, 1214, 1216, and 1218 may be associated with respective user models and their groupings of the groups 1202*a*, 1202*b*, and 1202*c* may be determined according to the block 318, 320, and 322 of the method 300.

Thus, systems and methods have been described that derive user representations from thousands of sessions on secure computing environments. The systems and method of the present disclosure accomplish this by intelligently parsing automatically recorded session logs of users to extract relevant information and tokenizing the enterprise's vocabulary by sampling these cleansed session logs that results in a fixed dictionary of text substrings that may be used in a domain that is a mixture of both natural language and formal language. The systems and methods of the present disclosure may then use the enterprise's fixed dictionary to build individual user representations and models using vectors representations of the session logs to model user behavior, intent, and use of the underlying application instances. These user models may be used to perform security actions, management actions, and/or to obtain useful information from the sessions. The systems and methods of the present disclosure provide benefits over conventional natural language processing techniques that cannot interpret session such as SSH session accurately due to the combination of both natural language and one or more formal languages in each session log. Also, the systems and methods of the present disclose provide security improvements over conventional computing environments that utilize a session protocol. While a few benefits are described, one of skill in the art in possession of the present disclosure will recognize that the systems and method provide other benefits and improvements to computing environments that utilize session protocols.

Figure 13:
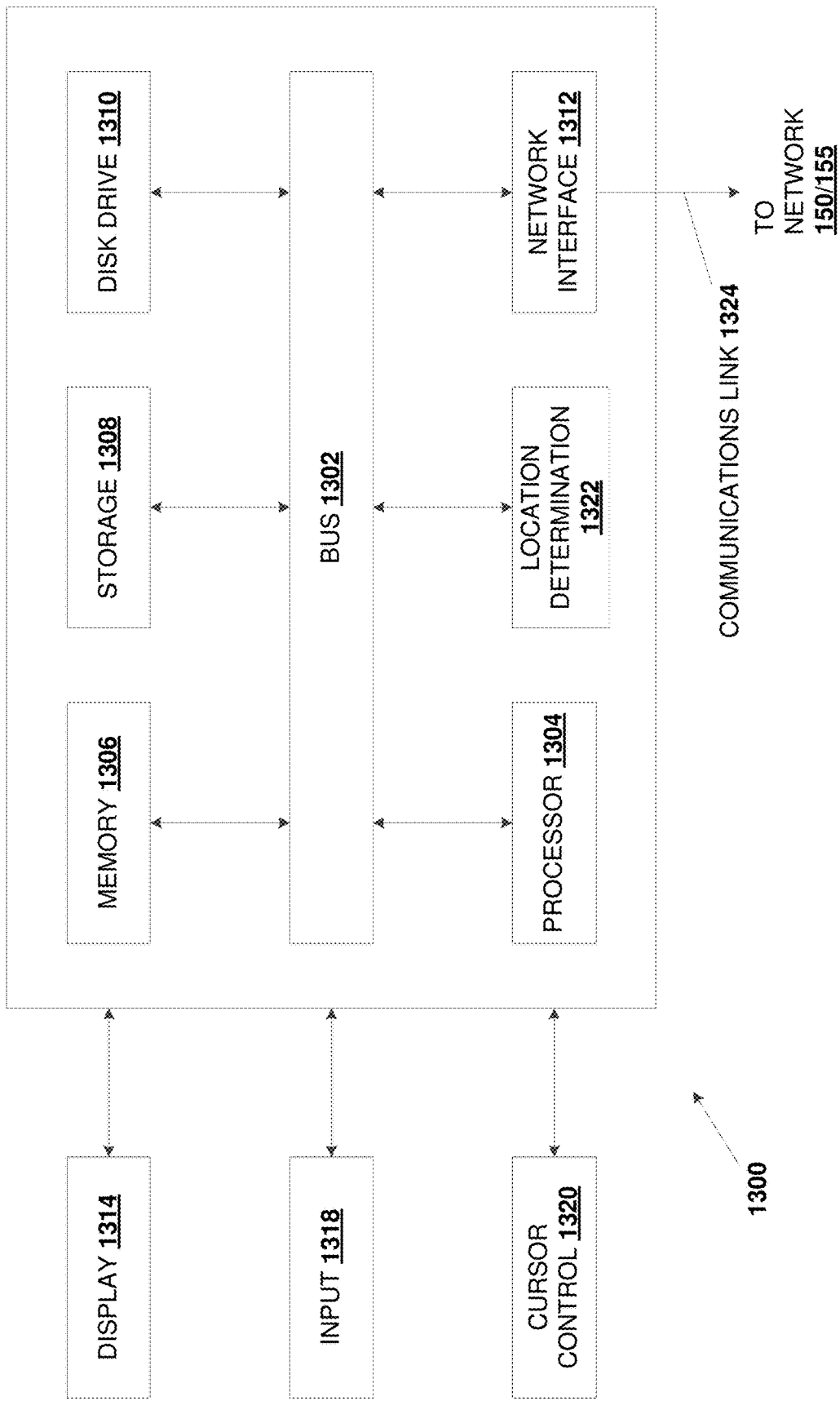
FIG. 13 is a block diagram of an example computer system according to various aspects of the present disclosure.

FIG. 13 is a block diagram of a computer system 1300 suitable for implementing one or more embodiments of the present disclosure, including the server computing devices 130 and 140 the client computing device 110, and the session management computing device 120. In various implementations, the client computing device 110 and the session management computing device 120 may include a mobile cellular phone, personal computer (PC), laptop, wearable computing device, etc. adapted for wireless communication, and the server computing devices 130 and 140 may include a network computing device, such as a server. Thus, it should be appreciated that the computing devices 110, 120, 130, and 140 may be implemented as the computer system 1300 in a manner as follows.

In accordance with various embodiments of the present disclosure, computer system 1300, such as a computer and/or a network server, includes a bus 1302 or other communication mechanism for communicating information, which interconnects subsystems and components, such as a processor 1304 (e.g., processor, micro-controller, digital signal processor (DSP), etc.), a system memory component 1306 (e.g., RAM), a static storage component 1308 (e.g., ROM), a disk drive component 1310 (e.g., magnetic or optical), a network interface component 1312 (e.g., modem or Ethernet card), a display component 1314 (e.g., CRT or LCD), an input component 1318 (e.g., keyboard, keypad, or virtual keyboard), a cursor control component 1320 (e.g., mouse, pointer, or trackball), and/or a location determination component 1322 (e.g., a Global Positioning System (GPS) device as illustrated, a cell tower triangulation device, and/or a variety of other location determination devices known in the art.) In one implementation, the disk drive component 1310 may comprise a database having one or more disk drive components.

In accordance with embodiments of the present disclosure, the computer system 1300 performs specific operations by the processor 1304 executing one or more sequences of instructions contained in the memory component 1306, such as described herein with respect to the computing devices and anomaly detection server, and/or any other device. Such instructions may be read into the system memory component 1306 from another computer readable medium, such as the static storage component 1308 or the disk drive component 1310. In other embodiments, hard-wired circuitry may be used in place of or in combination with software instructions to implement the present disclosure.

Logic may be encoded in a computer readable medium, which may refer to any medium that participates in providing instructions to the processor 1304 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1310, volatile media includes dynamic memory, such as the system memory component 1306, and transmission media includes coaxial cables, copper wire, and fiber optics, including wires that comprise the bus 1302. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1300. In various other embodiments of the present disclosure, a plurality of the computer systems 1300 coupled by a communication link 1324 to the network 150 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1300 may transmit and receive messages, data, information and instructions, including one or more programs (i.e., application code) through the communication link 1324 and the network interface component 1312. The network interface component 1312 may include an antenna, either separate or integrated, to enable transmission and reception via the communication link 1324. Received program code may be executed by processor 1304 as received and/or stored in disk drive component 1310 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a computing device, a server device, other devices described herein.

What is claimed is:

1. A system, comprising:
a non-transitory memory storing instructions; and
one or more hardware processors coupled to the non-transitory memory and configured to read the instructions from the non-transitory memory to cause the system to perform operations comprising:
accessing a session log comprising a recording of user interactions of a user during a session with an application instance in a computing environment;
cleansing the session log to remove a portion of content included in the session log;
generating, based on the cleansing, a cleansed session log;
converting the cleansed session log into a session vector representation using a finite dictionary built from a plurality of session logs associated with a plurality of users that have interacted with the computing environment;
generating a user model for the user using the session vector representation and a plurality of other session vector representations associated with the user, wherein the user model includes an average user vector that is a single vector calculated as an average of the plurality of other session vector representations associated with the user;
determining that a new session vector representation of a new session log of a new session does not satisfy a predetermined similarity threshold with the average user vector; and
performing, based on the determining that the new session vector representation does not satisfy the predetermined similarity threshold, a security action, wherein the performing the security action comprises:
determining a value of a distance between the new session vector representation and the average user vector;
evaluating, at least in part based on a comparison of the value of the distance with a predefined value, how far the new session vector representation is from the average user vector; and
selecting, based on a result of the evaluating, one type of security action from a plurality of types of security actions to perform.

2. The system of claim 1, wherein the plurality of types of security actions comprises: performing a step-up authentication of the user, diminishing one or more rights of the user, terminating the new session, or locking an account of the user.

3. The system of claim 1, wherein the operations further comprise:
recording the session with the application instance in the computing environment by executing a script that wraps an interactive shell of the session into a script command that records content displayed on a user computing device.

4. The system of claim 1, wherein the selecting comprises selecting, based on the result of the evaluating indicating that the value of the distance is greater than the predefined value, the step-up authentication of the user or the diminishing the one or more rights of the user as the one type of security action to perform.

5. The system of claim 1, wherein the session log comprises natural language content and formal language content, wherein the finite dictionary comprises natural language entries and formal language entries, and wherein the cleansing the session log comprises removing control sequences from the session log.

6. The system of claim 1, wherein the converting the cleansed session log into the session vector representation comprises:
using the finite dictionary and a vectorization algorithm to convert each sentence of the cleansed session log into a sentence vector to generate a sentence vector sequence; and
converting each sentence vector sequence of the cleansed session log to the session vector representation for the session log.

7. The system of claim 6, wherein each sentence comprises a current line of the cleansed session log and at least one of at least one previous line of the cleansed session log or at least one subsequent line of the session log.

8. The system of claim 1, wherein the operations further comprise:
providing a graphical representation of the user model on a management display device.

9. The system of claim 1, wherein the finite dictionary is built by identifying most frequently used substrings of text content up to a predetermined threshold such that a selection of substrings of text content is language agnostic.

10. A method, comprising:
accessing, by a computing device, a session log that comprises a history of user interactions of a user during a session with an application instance in a computing environment;
cleansing, by the computing device, the session log;
generating, by the computing device and based on the cleansing, a cleansed session log;
converting, by the computing device, the cleansed session log into a session vector representation using a finite dictionary built from a plurality of session logs associated with a plurality of users that have interacted with the computing environment;
determining, by the computing device, that the session vector representation does not satisfy a predetermined similarity threshold with a user model associated with a user account through which the session was initiated, the user model including an individual vector calculated as an average of plurality of other session vector representations associated with the user, wherein the determining is based on a distance between the individual vector and a new session vector representation of a new session log corresponding to a new session; and
performing, by the computing device based on the determining that the session vector representation does not satisfy the predetermined similarity threshold, a security action, wherein the performing the security action comprises:
comparing the distance with a specified threshold;
evaluating, based on the comparing, how far the new session vector representation is from the individual vector;
determining, based on a result of the evaluating, a likelihood of the new session being conducted by the user; and
selecting, based on the determined likelihood, one type of security action from a plurality of types of security actions to perform.

11. The method of claim 10, wherein the session log comprises a snapshot of the history of the user interactions of the user during the session with the application instance in the computing environment in real time.

12. The method of claim 11, wherein the security action includes ending the session with the application instance that is occurring in real time, performing a step-up authentication of the user, diminishing one or more rights of the user, terminating the new session, or locking an account of the user.

13. The method of claim 10, wherein the converting the cleansed session log into the session vector representation comprises:
converting, using the finite dictionary and a vectorization algorithm, each sentence of the cleansed session log into a sentence vector to generate a sentence vector sequence; and
converting each sentence vector sequence of the cleansed session log to the session vector representation for the session log.

14. The method of claim 13, wherein each sentence comprises a current line of the cleansed session log and at least one of at least one previous line of the cleansed session log or at least one subsequent line of the session log.

15. The method of claim 10, further comprising:

determining, by the computing device based on the security action indicating that the session log is valid, that the session log is associated with the user model associated with the user account;
determining, by the computing device, a management operation to perform to computing environment based on a changed behavior of the user that resulted in the determination that the session vector representation does not satisfy the predetermined similarity threshold with the user model; and
performing the management operation.

16. The method of claim 10, wherein the finite dictionary is built by identifying most frequently used substrings of text content up to a predetermined threshold such that a selection of substrings of text content are language agnostic.

17. A non-transitory machine-readable medium having stored thereon machine-readable instructions executable to cause a machine to perform operations comprising:
accessing a first model generated using a first plurality of session vector representations that are based on a first set of session logs associated with a first identifier, the first model including a first individual vector calculated as an average of the first plurality of session vector representations;
accessing a second model generated using a second plurality of session vector representations that are based on a second set of session logs associated with a second identifier, the second model including a second individual vector calculated as an average of the second plurality of session vector representations, wherein each of the first plurality of session vector representations and each of the second plurality of session vector representations are generated by:
cleansing a session log to generate a cleansed session log, wherein the session log that is a recording of user interactions of a user during a session with an application instance in a computing environment; and
converting the cleansed session log into a session vector representation using a finite dictionary built from a plurality of session logs associated with a plurality of users that interact with the computing environment;
determining, based on a distance between the first individual vector and the second individual vector, whether the first model and the second model satisfy a predetermined similarity threshold;
in response to a determination that the first model and the second model does not satisfy the predetermined similarity threshold, evaluating how much the second model deviates from the first model, wherein the evaluating is performed at least in part by comparing a value of the distance against a specified first value; and
performing a first management operation when the value of the distance is less than the specified first value, the first management operation comprising: performing a step-up authentication of the user or diminishing one or more rights of the user.

18. The non-transitory machine-readable medium of claim 17, wherein the operations further comprise:
accessing a third model generated using a third plurality of session vector representations that are based on a third set of session logs associated with a third identifier, the third model including a third individual vector calculated as an average of the third plurality of session vector representations;

determining, based on the distance between the first individual vector or the second individual vector with the third individual vector, that neither the first model nor the second model satisfies the predetermined similarity threshold; and performing a second management operation that segregates the first model and the second model from the third model.

19. The non-transitory machine-readable medium of claim 18, wherein the finite dictionary is built by identifying most frequently used substrings of text content up to a predetermined vocabulary threshold such that a selection of substrings of text content are language agnostic, and wherein the operations further comprise:

causing to be displayed at display device a graphical user interface that displays the first model and the second model as belonging to a first group and the third model belonging to a second group.

20. The non-transitory machine-readable medium of claim 17, wherein the operations further comprise temporarily preventing an access to an account of the user when the value of the distance is greater than or equal to the specified first value.

* * * * *